(12) United States Patent
Brunschwig et al.

(10) Patent No.: US 9,494,492 B2
(45) Date of Patent: Nov. 15, 2016

(54) USE OF SS DATA TRENDS IN FAULT RESOLUTION PROCESS

(71) Applicant: UNITED TECHNOLOGIES CORPORATION, Farmington, CT (US)

(72) Inventors: Anya R. Brunschwig, Wethersfield, CT (US); Amy R. Nordmark, Ellington, CT (US); Bryan P. Donovan, Pacific Palisades, CA (US); Andrew D. Ruestow, Hartford, CT (US); Gregory J. Kacprzynski, Fairport, NY (US); Charles Pelosi, Jupiter, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/134,398

(22) Filed: Dec. 19, 2013

(65) Prior Publication Data

US 2014/0358398 A1 Dec. 4, 2014

Related U.S. Application Data

(60) Provisional application No. 61/798,699, filed on Mar. 15, 2013.

(51) Int. Cl.
*G06Q 10/00* (2012.01)
*G01M 15/14* (2006.01)

(52) U.S. Cl.
CPC .................................. *G01M 15/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,418,388 A | * | 11/1983 | Allgor | G01R 31/007 700/74 |
| 4,424,709 A | * | 1/1984 | Meier, Jr. | G01M 15/09 701/102 |
| 5,572,424 A | * | 11/1996 | Kellogg | G01M 15/102 701/33.7 |
| 5,675,257 A | * | 10/1997 | Frus | F02C 7/266 324/380 |
| 6,684,163 B2 | * | 1/2004 | Antoine | F02C 9/00 700/30 |

(Continued)

*Primary Examiner* — Thomas Tarcza
*Assistant Examiner* — Richard Goldman
(74) *Attorney, Agent, or Firm* — Cantor Colburn LLP

(57) ABSTRACT

An automated method for resolving fault in an engine is disclosed. The method may include providing a reasoner module for recommending a set of maintenance actions to resolve fault in the engine, inputting steady state performance data from the engine into the reasoner module, and using the reasoner module to recommend a set of maintenance actions based at least in part on the steady state performance data. A fault resolution system for a gas turbine engine is also disclosed. The fault resolution system may include at least one computer processor operatively configured to receive steady state performance data from the gas turbine engine, and recommend a set of maintenance actions to resolve fault in the gas turbine engine based at least in part on the steady state performance data.

10 Claims, 6 Drawing Sheets

(56) References Cited

U.S. PATENT DOCUMENTS

| | | | | |
|---|---|---|---|---|
| 6,853,959 B2* | 2/2005 | Ikeda | G05B 23/0264 | 701/100 |
| 7,191,084 B2* | 3/2007 | Ponziani | F02C 7/266 | 324/401 |
| 7,197,430 B2* | 3/2007 | Jacques | F02C 9/00 | 701/100 |
| 7,280,941 B2* | 10/2007 | Bonanni | G05B 23/0281 | 700/30 |
| 7,375,531 B2* | 5/2008 | Ponziani | F02C 7/266 | 324/388 |
| 7,470,059 B2* | 12/2008 | Yoshida | G01K 15/00 | 374/102 |
| 7,769,507 B2 | 8/2010 | Volponi et al. | | |
| 7,890,296 B2* | 2/2011 | Brown | G05B 23/0254 | 700/28 |
| 8,467,949 B2* | 6/2013 | Kim | F02C 7/26 | 701/100 |
| 8,751,423 B2* | 6/2014 | Pandey | F02C 9/00 | 701/100 |
| 2002/0059075 A1* | 5/2002 | Schick | B61L 27/0094 | 701/31.4 |
| 2004/0088991 A1* | 5/2004 | Gallant | G05B 9/03 | 60/772 |
| 2004/0176879 A1* | 9/2004 | Menon | F02C 9/00 | 701/1 |
| 2004/0176901 A1* | 9/2004 | Uluyol | F02C 9/00 | 701/100 |
| 2005/0209767 A1* | 9/2005 | Kim | G05B 23/024 | 701/100 |
| 2005/0267702 A1* | 12/2005 | Shah | G05B 23/0229 | 702/81 |
| 2006/0085108 A1* | 4/2006 | Grier | G05B 23/0248 | 701/29.1 |
| 2006/0265183 A1* | 11/2006 | Jacques | F02C 9/00 | 702/181 |
| 2007/0088982 A1* | 4/2007 | Guralnik | G05B 23/0262 | 714/26 |
| 2007/0124113 A1* | 5/2007 | Foslien | G05B 23/024 | 702/185 |
| 2007/0234734 A1* | 10/2007 | Uluyol | F02C 7/26 | 60/778 |
| 2007/0260390 A1* | 11/2007 | Kim | F01D 21/00 | 701/100 |
| 2008/0071443 A1* | 3/2008 | Cox | F01D 17/20 | 701/33.4 |
| 2008/0228338 A1* | 9/2008 | Howard | G05B 23/0278 | 701/31.4 |
| 2008/0282784 A1* | 11/2008 | Friis-Knudsen | F02B 77/10 | 73/114.01 |
| 2008/0294311 A1* | 11/2008 | Henson | F02D 41/221 | 701/31.4 |
| 2010/0017092 A1* | 1/2010 | Butler | F01D 21/003 | 701/100 |
| 2010/0106462 A1* | 4/2010 | Liu | G01M 15/14 | 702/185 |
| 2010/0161197 A1* | 6/2010 | Moeckly | G05B 23/0281 | 701/99 |
| 2010/0168952 A1* | 7/2010 | Falkmann | F02C 9/00 | 701/31.4 |
| 2010/0286862 A1* | 11/2010 | Fox | G01C 21/3605 | 701/31.4 |
| 2011/0029223 A1* | 2/2011 | Mounetou | F02D 41/222 | 701/114 |
| 2011/0047418 A1* | 2/2011 | Drees | G05B 15/02 | 714/57 |
| 2011/0054721 A1* | 3/2011 | Goodrich | G05B 23/0283 | 701/14 |
| 2011/0153128 A1* | 6/2011 | Wright | B60L 11/005 | 701/22 |
| 2011/0276247 A1* | 11/2011 | Carratt | F02C 9/28 | 701/100 |
| 2012/0173076 A1* | 7/2012 | Anderson | F02B 39/16 | 701/34.4 |
| 2012/0330495 A1* | 12/2012 | Geib | F01D 21/003 | 701/29.6 |
| 2013/0041570 A1* | 2/2013 | Sekine | F02D 41/22 | 701/102 |
| 2013/0090831 A1* | 4/2013 | Kwon | G01H 17/00 | 701/99 |
| 2013/0114878 A1* | 5/2013 | Scheid | G06T 7/001 | 382/141 |
| 2013/0338855 A1* | 12/2013 | Mason | G07C 5/0816 | 701/2 |
| 2014/0222310 A1* | 8/2014 | Volponi | F02C 6/00 | 701/101 |
| 2014/0372010 A1* | 12/2014 | Han | G01M 15/102 | 701/108 |
| 2015/0025720 A1* | 1/2015 | Bae | B60K 6/485 | 701/22 |

\* cited by examiner

Edit Observation

Id [7]

Warning: Only change the ID if you know what you are doing!

Name [AJ Open]

Type [CITADS ▼]

Fault Code references

☑ 1020
☑ 1040
☑ 1041
☑ 4003
☑ 4220
☑ 4290
☑ 1050

(Update)

USE OF SS DATA TRENDS IN FAULT RESOLUTION PROCESS

STATEMENT OF GOVERNMENT INTEREST

The United States Government has certain rights in this invention pursuant to contract number FA8650-09-D-2923 0012 between the United States Air Force and United Technologies Corporation.

FIELD OF THE DISCLOSURE

The present disclosure relates generally to gas turbine engines and, more particularly, to systems and methods for resolving fault in a gas turbine engine.

BACKGROUND OF THE DISCLOSURE

A goal of gas turbine engine fault diagnostics is to accurately detect, isolate and resolve critical faults in a gas turbine engine. When a fault occurs in a gas turbine engine, it is difficult to identify the fault because the effects of the fault on the engine may not be readily apparent, or unique, in terms of their source. Typically, fault resolution has been performed by engine maintenance personnel, or maintainers, who utilize static punch list checklists documented in maintenance books.

Based on the instructions and troubleshooting trees in the maintenance books, the maintainers then examine each part of the engine to try to determine which part is the root cause of the problem. This may sometimes be a lengthy troubleshooting process. Furthermore, more steps may be executed and more parts may be replaced than needed, in order to fix the problem.

Accordingly, there exists a need to provide a system and method that will ensure the most streamlined fault resolution instructions, which can reduce the time it takes for troubleshooting, the number of unnecessary replaced parts, as well as the number of unscheduled engine removals.

SUMMARY OF THE DISCLOSURE

According to one embodiment of the present disclosure, an automated method for resolving a fault in an engine is disclosed. The method may comprise providing a reasoner module for recommending a set of maintenance actions to resolve the fault in the engine, inputting steady state performance data from the engine into the reasoner module, and using the reasoner module to recommend a set of maintenance actions based at least in part on the steady state performance data.

In a refinement, the method may further comprise using the reasoner module to compare the steady state performance data to desired engine performance patterns, and using the reasoner module to provide a set of maintenance actions based at least in part on the comparison of steady state performance data to the desired engine performance patterns.

In a related refinement, the method may further comprise displaying the comparison of steady state performance data to the desired engine performance patterns as a percentage of similarity between the steady state performance data and the desired engine performance patterns.

In another refinement, the method may further comprise inputting engine fault codes into the reasoner module, and using the reasoner module to provide a set of maintenance actions based at least in part on the engine fault codes.

In a related refinement, the method may further comprise inputting transient data from the engine into the reasoner module, and using the reasoner module to provide a set of maintenance actions based at least in part on the transient data.

In another related refinement, the method may further comprise inputting maintainer observations into the reasoner module, and using the reasoner module to provide a set of maintenance actions based at least in part on the maintainer observations.

In another related refinement, the method may further comprise providing a connectivity matrix linking the steady state performance data, engine fault codes, transient data, and maintainer observations to maintenance actions.

In another related refinement, the method may further comprise using the reasoner module to rank the set of maintenance actions in order of importance.

In another refinement, the method may further comprise using the reasoner module to identify trends based on the steady state performance data.

In a related refinement, the method may further comprise using the reasoner module to match the steady state performance data trends to desired engine performance patterns.

According to another embodiment of the present disclosure, a non-transitory computer readable storage medium storing instructions which when executed by a computer resolves a fault in a gas turbine engine is disclosed. The non-transitory computer readable storage medium may comprise instructions for receiving a plurality of input data including steady state performance data; and providing a set of maintenance actions based on the plurality of input data.

In a refinement, the non-transitory computer readable storage medium may further comprise instructions for relating the steady state performance data to desired engine performance patterns, and recognizing steady state performance data trends based on the relation of the steady state performance data to desired engine performance patterns.

In a related refinement, the non-transitory computer readable storage medium may further comprise instructions for creating a connectivity matrix configured to connect the steady state performance trends to maintenance actions.

In another related refinement, the non-transitory computer readable storage medium may further comprise instructions for updating the connectivity matrix using the plurality of input data and the provided set of maintenance actions.

In another refinement, the non-transitory computer readable storage medium may further comprise instructions for ranking the set of maintenance actions.

In another refinement, the plurality of input data may further include engine transient data, fault codes, and maintainer observations.

According to yet another embodiment of the present disclosure, a fault resolution system for a gas turbine engine is disclosed. The fault resolution system may comprise at least one computer processor operatively configured to receive steady state performance data from the gas turbine engine, and recommend a set of maintenance actions to resolve fault in the gas turbine engine based at least in part on the steady state performance data.

In a refinement, the at least one computer processor may be operatively configured to receive engine transient data and engine fault codes from the gas turbine engine and observations from a maintainer, and recommend the set of maintenance actions based at least in part on the engine transient data, engine fault codes, and maintainer observations.

In another refinement, the at least one computer processor may be operatively configured to produce a connectivity matrix linking the steady state performance data, engine transient data, engine fault codes, and maintainer observations to maintenance actions.

In yet another refinement, the at least one computer processor may be operatively configured to rank the set of maintenance actions in an order best suited to resolve the fault in the engine.

These and other aspects and features of the disclosure will become more readily apparent upon reading the following detailed description when taken in conjunction with the accompanying drawings. Although various features are disclosed in relation to specific exemplary embodiments of the invention, it is understood that the various features may be combined with each other, or used alone, with any of the various exemplary embodiments of the invention without departing from the scope of the invention.

BRIEF DESCRIPTION OF THE DRAWINGS

FIG. 5 is a display of an administration tool of the fault resolution system of FIG. 2.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents along within the spirit and scope of the present disclosure.

DETAILED DESCRIPTION

Figure 1:
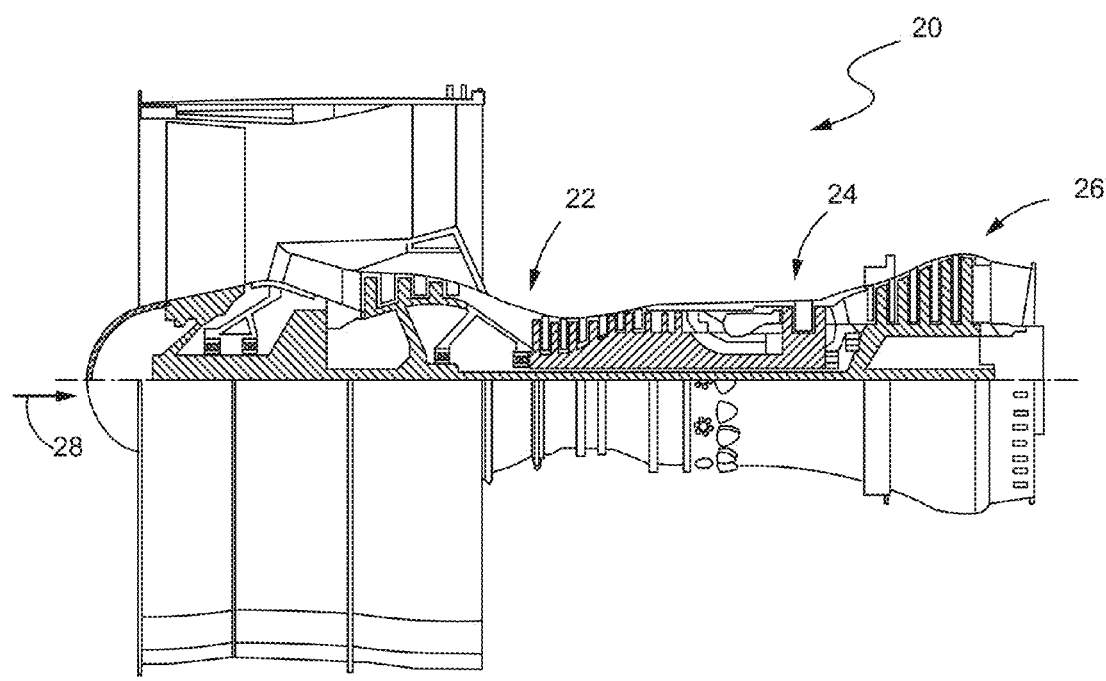
FIG. 1 is a cross-sectional view of a gas turbine engine according to an embodiment of the present disclosure.

Referring now to the drawings, and with specific reference to FIG. 1, in accordance with the teachings of the disclosure, an exemplary gas turbine engine 20 is shown. The gas turbine engine 20 may generally comprise a compressor section 22 where air is pressurized, a combustor 24 downstream of the compressor section which mixes and ignites the compressed air with fuel and thereby generates hot combustion gases, a turbine section 26 downstream of the combustor 24 for extracting power from the hot combustion gases, and an annular flow path 28 extending axially through each. Gas turbine engine 20 may be used on an aircraft for generating thrust or power or in land-based generators for generating power as well.

Figure 2:
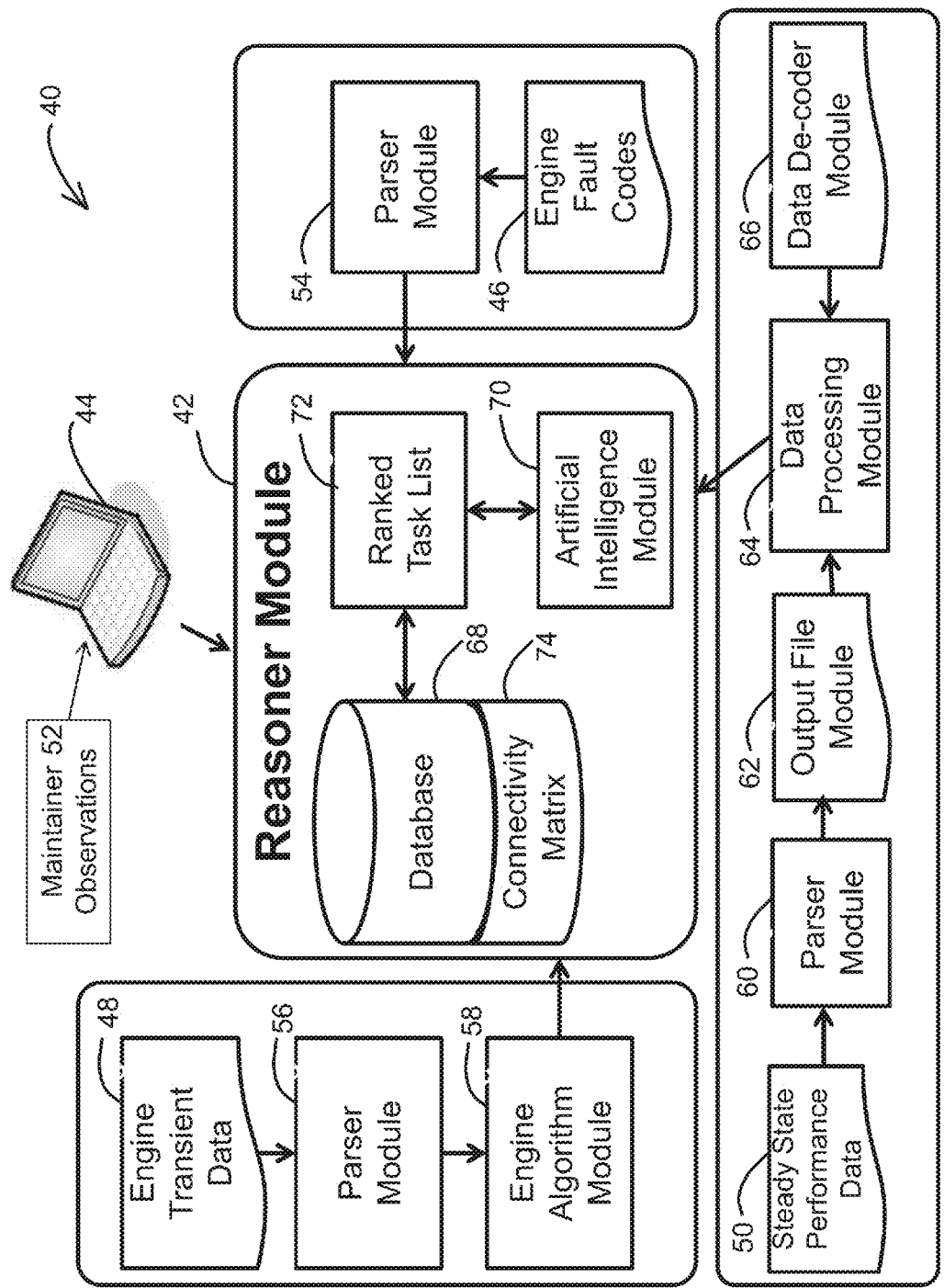
FIG. 2 is a schematic representation of a fault resolution system according to an embodiment of the present disclosure.

Turning now to FIG. 2, with continuing reference to FIG. 1, an exemplary fault resolution system 40 according to one embodiment of the present disclosure is shown. Fault resolution system 40 may be used to resolve faults in the gas turbine engine 20 of FIG. 1. Examples of faults or symptoms may be unusually high or low temperatures, unusually high or low pressures, leaks, etc. Fault resolution system 40 may comprise a reasoner module 42 for recommending a set of maintenance actions based on different types of data acquired from the engine 20 and input into the reasoner module 42. Reasoner module 42 may comprise any non-transitory computer readable storage medium 44, such as, for example, a computer processor. Input data, such as engine fault codes 46, engine transient data 48, and steady state performance data 50, may be stored in an engine control unit of the gas turbine engine 20 and subsequently downloaded to the fault resolution system 40. In addition to input data received from the engine 20, fault resolution system 40 may also receive input data from other sources, such as maintainer observations 52 or information that a maintainer or operator of the engine 20 may observe.

Engine fault codes 46 may be set during in-flight engine operation when a fault occurs. After downloading the fault codes 46 to the fault resolution system 40, fault codes 46 may be sent to parser module 54, which changes the fault codes 46 into allowable input data for the reasoner module 42. Engine transient data 48 may be transient data collected by sensors, control logic, or other parts in the engine 20 before and after the fault occurs and fault code is set. After downloading the fault codes 46 to the fault resolution system 40, transient data 48 may be sent to parser module 56 and to an engine algorithm module 58 in order to change the transient data 48 into allowable input data for the reasoner module 42.

Steady state performance data 50 may be collected by the engine control unit. For example, when the engine 20 satisfies stable operation criteria during take-off, a steady state performance data point is captured. The steady state performance data point may contain data about different parameters, such as data from sensors and flight condition information. Exemplary sensor data may include data detected from pressure transducers, such as at the engine inlet, compressor exit, and turbine exhaust, rotor speeds on high and low speed rotors, thermocouples in the turbine, main engine fuel flow, fan and compressor variable vane position, and/or light-off detector signals. Exemplary flight condition information may include power level angle, altitude, and Mach number. Steady state performance data 50 may comprise a set of data points captured at the same exact time with the same exact throttle position during take-off over a series of flights. After downloading the steady state performance data to the fault resolution system 40, steady state performance data 50 may be sent to a parser module 60, output file module 62, and a data processing module 64, which may also be in communication with a data de-coder module 66, in order to change the steady state performance data 50 into allowable input data for the reasoner module 42.

Figure 3:
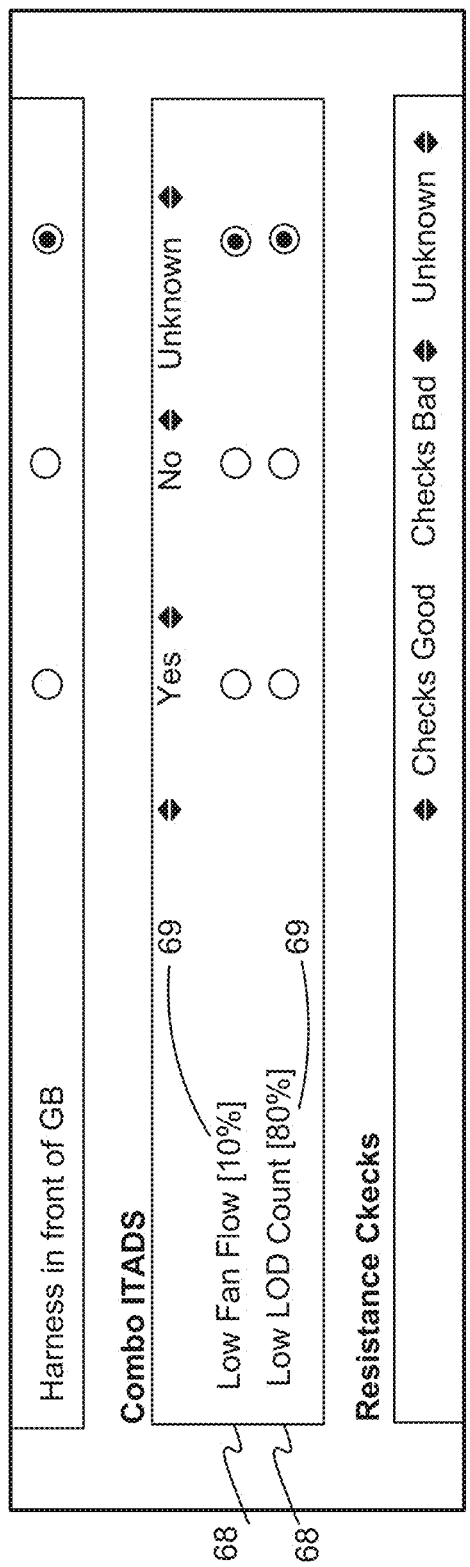
FIG. 3 is a display of a steady state performance trend to a user of the fault resolution system of FIG. 2.

Reasoner module 42 may compare the steady state performance data 50 to desired engine performance patterns. For example, reasoner module 42 may take the set of data points captured over the series of flights and identify steady state performance trends based on a plot of the data points over time. Reasoner module 42 may then compare the steady state performance trends to desired engine performance patterns to identify emerging engine issues. As shown in FIG. 3, reasoner module 42 may display the comparison of steady state performance data 50 to desired engine performance patterns 68 as a percentage 69 of similarity between the two. Based on the percentage, the maintainer can identify whether certain parameters of the steady state performance data are trending toward the desired engine performance pattern. For example, a higher percentage for one parameter may indicate to the maintainer that the parameter is on its way to trend outside an acceptable error band.

Figure 4:
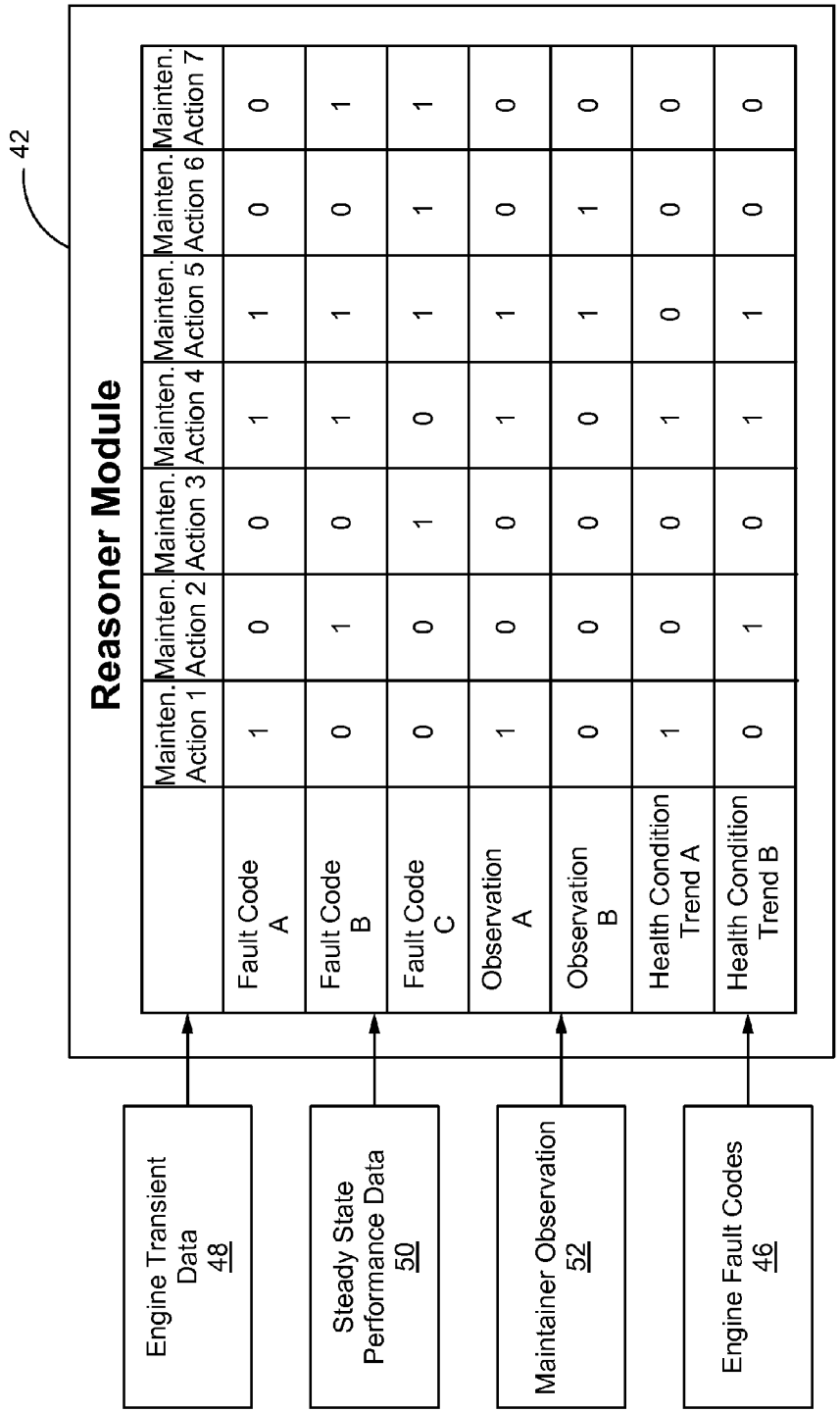
FIG. 4 is a connectivity matrix of the fault resolution system of FIG. 2.

Reasoner module 42 takes the different input data (engine fault codes 46, engine transient data 48, steady state performance data 50, and maintainer observations 66) and recommends a set of maintenance actions to resolve the fault in the engine 20. Reasoner module 42 may include, as shown in FIG. 2, a database 68 and artificial intelligence module 70 to provide a ranked task list 72, ranking the set of maintenance actions in an order of importance best suited to resolve the fault. More specifically, as shown in FIG. 4, a connectivity matrix 74 links the engine fault codes 46, engine transient data 48, steady state performance data 50, and maintainer observations 52 to maintenance actions. The connectivity matrix 74, which is associated with the database 68, contains relational data between maintenance actions best suited to fix the fault and the input data associated with the health of the engine 20. The connectivity matrix 74 may display a "1" to indicate a relationship between the input data and the maintenance action, and a "0" to indicate no relationship between the input data and the maintenance actions. If, for example, a significant amount of input data were related to a certain maintenance action, then that maintenance action would have a higher ranking in the outputted task list 72.

Updates to the fault resolution system 40 may be made either by the system itself or by maintenance personnel. The artificial intelligence module 70 may automatically update the reasoner module 42 and connectivity matrix 74 using the input data and ranked task list 72. In addition, as shown in FIG. 5, an administration tool 76 may allow maintainers to manage and update the connectivity matrix 74 by adding or deleting fault code references related to the steady state performance data. The administration tool 76 may also allow maintainers to enter their observations 52 of the engine 20 as a source of input data to the fault resolutions system 40.

Figure 6:
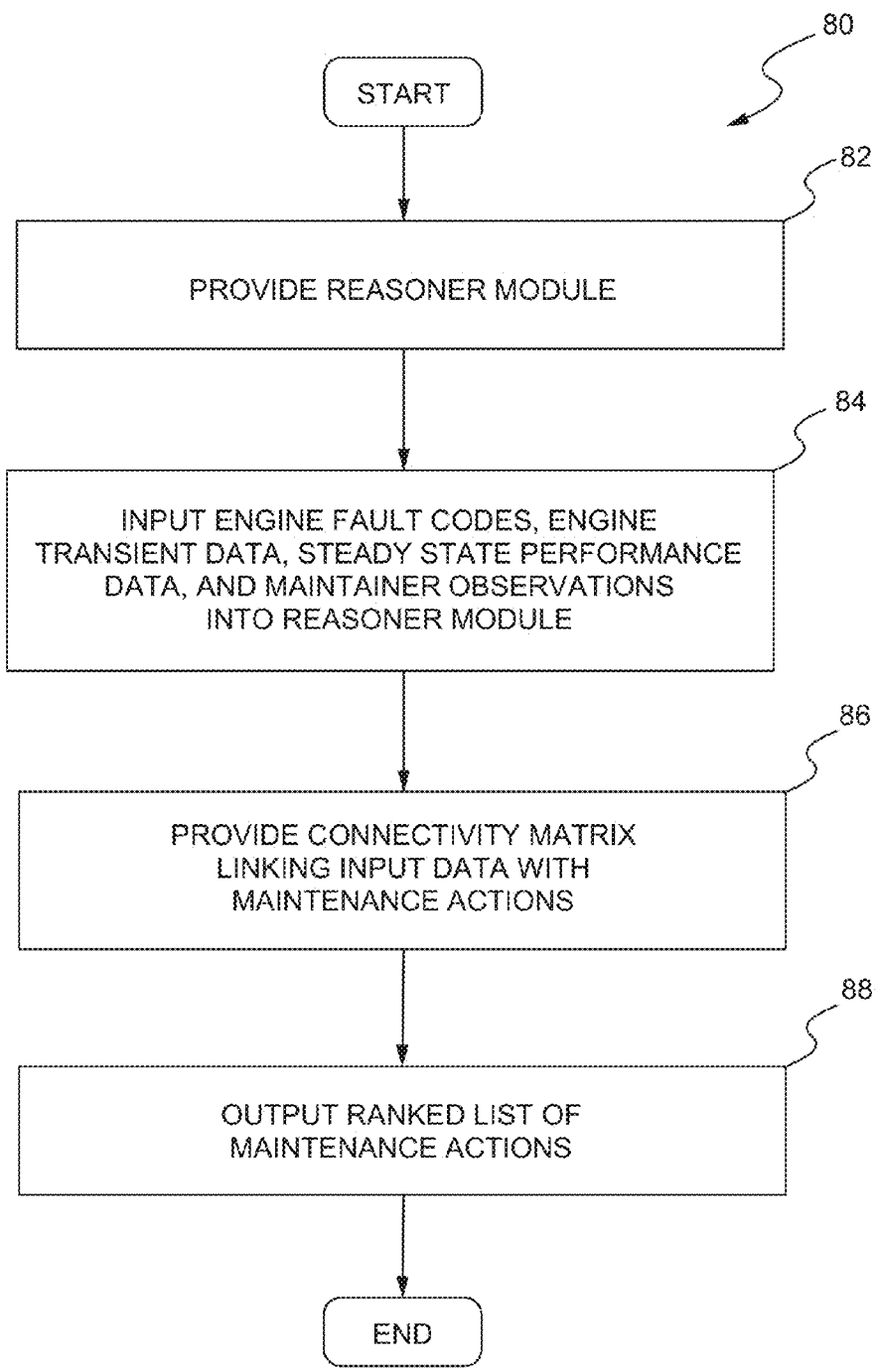
FIG. 6 is a flow diagram outlining an automated method for resolving fault in a gas turbine engine, according to an embodiment of the present disclosure.

Turning now to FIG. 6, with continued reference to FIGS. 1-5, a flow diagram outlining an automated method 80 for resolving fault in the gas turbine engine 20 is shown, according to an exemplary embodiment of the present disclosure. At a first step 82, the reasoner module 42 is provided for recommending a set of maintenance actions to resolve fault in the engine. At a second step 84, the engine fault codes fault codes 46, engine transient data 48, steady state performance data 50, and maintainer observations 52 are input into the reasoner module 42. At a next step 86, the reasoner module 42 is used to provide the connectivity matrix 74 is linking the input data (the engine fault codes fault codes 46, engine transient data 48, steady state performance data 50, and maintainer observations 52) with maintenance actions. At a final step 88, the reasoner module 42 outputs a ranked list of maintenance actions based on the input data and results of the connectivity matrix 74.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The disclosure described provides an automated system and method for resolving fault in a gas turbine engine. The disclosed fault resolution system and method utilizes steady state performance data, which has not been applied in the prior art. The use of steady state performance data further isolates the root cause of the engine fault, thereby resulting in a more sophisticated troubleshooting tool to resolve engine fault. Furthermore, the disclosed system and method provides a connectivity matrix, which automatically links the different classes of evidence or input data to a set of maintenance actions, thereby resulting in more streamlined instructions to a maintainer. By providing more sophisticated and streamlined fault resolution instructions to a maintainer, the amount of maintenance steps performed to resolve a fault, the time it takes for troubleshooting, the number of unnecessary replaced parts, and the occurrence of unscheduled engine removals are all significantly reduced.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto.

What is claimed is:

1. A non-transitory computer readable storage medium storing computer-executable instructions which when executed by a computer resolve a fault in a gas turbine engine, the non-transitory computer readable storage medium comprising instructions for:
   receiving a plurality of input data from an electronic control unit of the gas turbine engine including steady state performance data of the gas turbine engine;
   compiling the received plurality of input data with a parser module within the computer;
   loading the compiled plurality of input data into a connectivity matrix linking the compiled plurality of input data to a maintenance action for the gas turbine engine; and
   generating a set of maintenance actions to resolve a fault in the gas turbine engine based on the compiled plurality of input data.

2. The non-transitory computer readable storage medium of claim 1, further comprising instructions for relating the steady state performance data to desired engine performance patterns, and recognizing steady state performance data trends based on the relation of the steady state performance data to desired engine performance patterns.

3. The non-transitory computer readable storage medium of claim 2, further comprising instructions for creating the connectivity matrix configured to connect the steady state performance trends to maintenance actions.

4. The non-transitory computer readable storage medium of claim 3, further comprising instructions for updating the connectivity matrix using the plurality of input data and the provided set of maintenance actions.

5. The non-transitory computer readable storage medium of claim 1, further comprising instructions for ranking the set of maintenance actions.

6. The non-transitory computer readable storage medium of claim 1, wherein the plurality of input data further includes engine transient data, fault codes, and maintainer observations.

7. A fault resolution system for a gas turbine engine, comprising: at least one computer processor operatively configured to
   receive steady state performance data from an electronic control unit of the gas turbine engine;
   compile the steady state performance data with a parser module within the computer processor to create compiled steady state performance data readable by the computer processor;
   load the compiled steady state performance data to a connectivity matrix of the computer processor, the connectivity matrix linking the compiled steady state performance data to a maintenance action; and output a ranked set of maintenance actions to resolve a fault in the gas turbine engine determined by module of the computer processor based at least in part on the compiled steady state performance data.

8. The fault resolution system of claim 7, wherein the at least one computer processor is operatively configured to receive engine transient data and engine fault codes from the gas turbine engine and observations from a maintainer, and output the ranked set of maintenance actions based at least in part on the engine transient data, engine fault codes, and maintainer observations.

9. The fault resolution system of claim 7, wherein the at least one computer processor is operatively configured to produce the connectivity matrix linking the steady state performance data, engine transient data, engine fault codes, and maintainer observations to maintenance actions.

10. The fault resolution system of claim 7, wherein the at least one computer processor is operatively configured to rank the ranked set of maintenance actions in an order best suited to resolve the fault in the engine.

* * * * *